United States Patent
Kawabe et al.

(10) Patent No.: US 6,910,723 B2
(45) Date of Patent: Jun. 28, 2005

(54) SEAT MOUNTING DEVICES

(75) Inventors: Hideki Kawabe, Aichi-ken (JP); Akiyoshi Okugawa, Toyota (JP)

(73) Assignee: Araco Kabushiki Kaisha (JP)

( * ) Notice: Subject to any disclaimer, the term of this patent is extended or adjusted under 35 U.S.C. 154(b) by 0 days.

(21) Appl. No.: 10/663,515

(22) Filed: Sep. 16, 2003

(65) Prior Publication Data

US 2004/0075307 A1 Apr. 22, 2004

(30) Foreign Application Priority Data

Sep. 19, 2002 (JP) ........................................ 2002-273776

(51) Int. Cl.$^7$ ................................................ B60N 2/44
(52) U.S. Cl. .................. 296/65.03; 297/336; 248/503.1
(58) Field of Search ................ 296/63, 65.01, 296/65.03; 297/336, 335, 331; 248/503.1

(56) References Cited

U.S. PATENT DOCUMENTS

| | | | | |
|---|---|---|---|---|
| 3,410,600 A | | 11/1968 | Thorpe | |
| 4,773,693 A | * | 9/1988 | Premji et al. ............ | 296/65.03 |
| 4,955,973 A | | 9/1990 | Provencher | |
| 4,978,158 A | | 12/1990 | Kubo et al. | |
| 5,562,322 A | * | 10/1996 | Christoffel ............... | 296/65.03 |
| 5,775,763 A | * | 7/1998 | Glinter et al. ........... | 296/65.03 |
| 5,951,086 A | * | 9/1999 | Hoshino et al. ......... | 296/65.03 |
| 6,056,346 A | * | 5/2000 | Smuk ....................... | 296/65.03 |
| 6,135,533 A | * | 10/2000 | Mack et al. .............. | 296/65.03 |
| 6,270,140 B1 | | 8/2001 | Opfer et al. | |
| 6,286,886 B1 | | 9/2001 | Odagaki | |
| 6,345,856 B1 | * | 2/2002 | Minai ....................... | 296/65.03 |
| 6,345,867 B1 | * | 2/2002 | Hellrung et al. ............ | 297/336 |
| 6,375,245 B1 | * | 4/2002 | Seibold et al. ........... | 296/65.03 |
| 6,631,879 B2 | * | 10/2003 | Hibino et al. ............... | 248/429 |
| 6,749,264 B2 | * | 6/2004 | Jeong ..................... | 297/378.13 |

FOREIGN PATENT DOCUMENTS

| | | |
|---|---|---|
| FR | 2 817 205 | 5/2002 |
| GB | 2 071 749 A | 9/1981 |
| GB | 2 128 473 A | 5/1984 |
| JP | 10-236198 | 9/1998 |

* cited by examiner

Primary Examiner—Patricia L. Engle
(74) Attorney, Agent, or Firm—Patterson, Thuente, Skaar & Christensen, P.A.

(57) ABSTRACT

A seat mounting device for a vehicle seat may include at least two locking mechanisms (20) provided on one of a vehicle seat (40) and a vehicle body, and an engagement member (43) provided on the other of the vehicle seat and the vehicle body. The locking mechanisms (20) are interconnected via an interconnecting member (26, 28). The engagement member (43) is arranged and constructed to be locked by the locking mechanisms (20). The locking mechanisms (20) and the engagement member (43) are arranged and constructed such that the engagement member (43) can be engaged with or removed from the locking mechanisms (20) by moving the vehicle seat (40) in one direction.

6 Claims, 6 Drawing Sheets

US 6,910,723 B2

SEAT MOUNTING DEVICES

This application claims priority to Japanese Patent Application Ser. No. 2002-273776, the contents of which are incorporated herein by reference.

BACKGROUND OF THE INVENTION

1. Field of the Invention

The present invention relates to seat mounting devices for a vehicle seat. More particularly, the present invention relates to seat mounting devices for removably mounting a vehicle seat on a vehicle body.

2. Description of the Related Art

A seat mounting device for removably mounting a vehicle seat on a vehicle body is taught, for example, by Japanese Laid-Open Patent Publication No. 10-236198.

In the known art described in Japanese Laid-Open Patent Publication No. 10-236198, a vehicle body is provided with a support bar. The support bar is secured to the vehicle body at both ends and is provided with a pair of annular receiving members that are fixed thereto. On the other hand, a vehicle seat is provided with a pair of engagement members that are arranged and constructed to respectively correspond to the receiving members. Further, the vehicle seat is provided with a disengagement preventing means or locking means. The locking means comprises a locking lever that is biased counterclockwise by a spring and an operation lever that is linked to the locking lever.

When the seat is mounted on the vehicle body, the engagement members of the seat are rearwardly moved along the support bar and are engaged with the corresponding receiving members. At this time, the locking lever of the locking means contacts the rear end of one of the receiving members, thereby preventing the engagement members of the seat from disengaging from the receiving members of the vehicle body. As a result, the engagement members and the receiving members are locked. Thus, the vehicle seat is mounted on the vehicle body.

Further, when the seat is dismounted from the vehicle body, the locking lever is rotated clockwise by operating the operation lever of the locking means and is disengaged from the rear end of one of the receiving members. Thus, the engagement members and the receiving members are unlocked. Therefore, the engagement members can be forwardly moved along the support bar, so as to be disengaged from the receiving members. As a result, the vehicle seat can be dismounted from the vehicle body.

SUMMARY OF THE INVENTION

It is, accordingly, one object of the present teachings to provide improved mounting devices for removably mounting a vehicle seat.

For example, in one aspect of the present teachings, a seat mounting device for a vehicle seat may include at least two locking mechanisms provided on one of a vehicle seat and a vehicle body, and an engagement member provided on the other of the vehicle seat and the vehicle body. The locking mechanisms are interconnected via an interconnecting member, so as to be synchronously operated each other. The engagement member is arranged and constructed to be locked by the locking mechanisms. The locking mechanisms and the engagement member are preferably arranged and constructed such that the engagement member can be engaged with or removed from the locking mechanisms by moving the vehicle seat in one direction.

Thus, the engagement member can be supported by a plurality of locking mechanisms. Therefore, the vehicle seat can be reliably mounted on the vehicle body. Further, the vehicle seat can be easily mounted on or dismounted from the vehicle body, because the engagement member can be engaged with or removed from the locking mechanism by simply moving the vehicle seat in one direction.

Other objects, features and advantage of the present invention will be ready understood after reading the following detailed description together with the accompanying drawings and the claims.

DETAILED DESCRIPTION OF THE INVENTION

In one embodiment of the present teachings, seat mounting devices for a vehicle seat may comprise at least two locking mechanisms provided on one of a vehicle seat and a vehicle body, and a bar provided on the other of the vehicle seat and the vehicle body. The locking mechanisms may preferably be interconnected via rods, so as to be synchronously operated each other. The bar may be arranged and constructed to be locked by the locking mechanisms. The locking mechanisms and the bar may preferably be arranged and constructed such that the bar can be engaged with or removed from the locking mechanisms by moving the vehicle seat in one direction.

Optionally, the seat mounting device may further comprise a lever for unlocking the locking mechanisms. The lever may preferably be attached to the rods. Typically, the locking mechanisms may be respectively provided on the vehicle body and the bar may be provided on the vehicle seat.

Optionally, the lever may preferably comprise a manipulation portion and an operation portion. Further, the locking mechanism may preferably has a hook that engages the bar and a pawl that engages the hook and maintains it in a locking position. When the lever is operated, the manipulation portion may be moved relative to the operation portion, thereby disengaging the pawl from the hook, and then the operation portion may be moved together with the manipulation portion, thereby moving the hook to an unlocking position.

Two detailed representative embodiments of the present teachings will now be described in further detail with reference to FIGS. 1 to 9.

First Detailed Representative Embodiment

The first detailed representative embodiment will now be described with reference to FIGS. 1 to 8.

Figure 1:
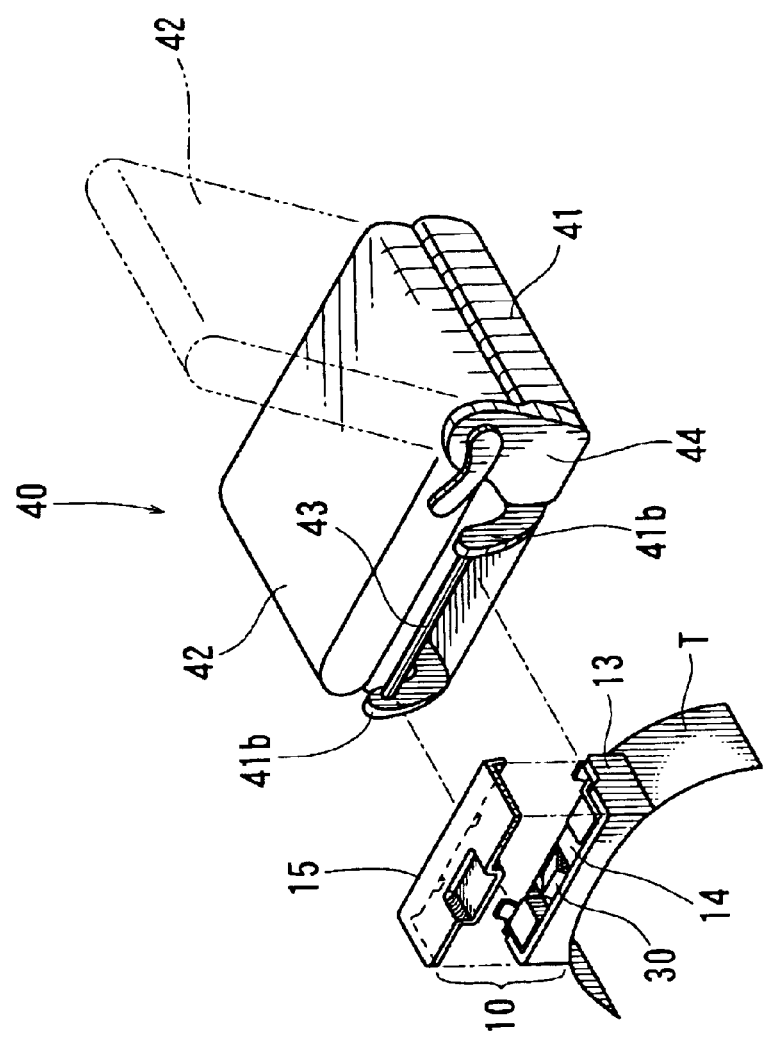
FIG. 1 is a perspective view of a seat mounting device according to a first embodiment of the present teachings, which view illustrates a dismounted condition of a vehicle seat.

As shown in FIG. 1, a vehicle seat 40 of this embodiment is a retractable seat. That is, the vehicle seat 40 is a common type of seat that can be folded and put against a side wall of a vehicle body (which will be hereinafter described). Typically, the seat 40 comprises a seat cushion 41 and a seat back 42. The seat cushion 41 and the seat back 42 are rotatably or pivotally connected via a reclining mechanism 44. As a result, the seat back 42 can be rotated from a raised or vertical position shown by a broken line in FIG. 1 to a folded or horizontal position shown by a solid line in FIG. 1. Further, a tilt angle of the seat back 42 in the vertical position can be adjusted over a predetermined range.

Figure 2:
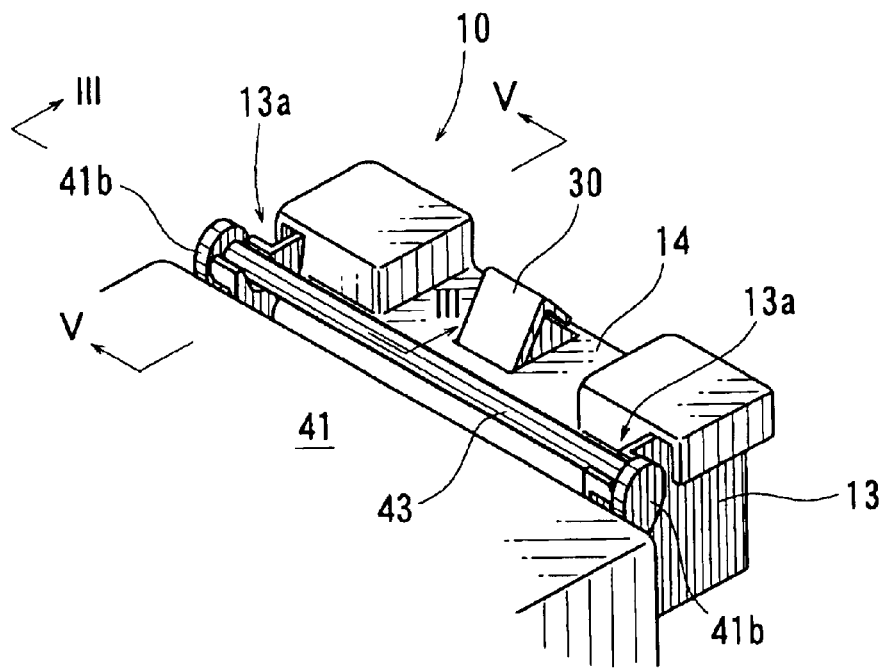
FIG. 2 is a perspective view of the seat mounting device in which an outer cover is omitted, which view illustrates a mounted condition of the vehicle seat.
Figure 3:
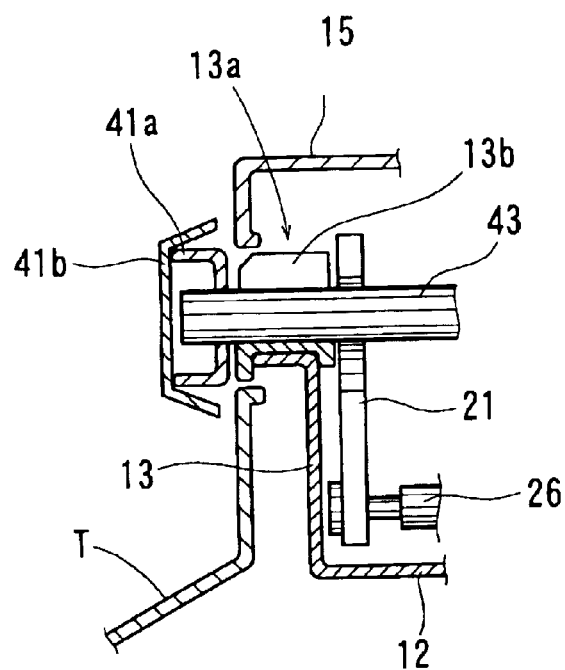
FIG. 3 is a cross-sectional view taken along line III—III in FIG. 2.

As shown in FIGS. 1–3, a locking mechanism receiving case 10 is attached to a vehicle body (e.g., a quarter trim panel T). Typically, the case 10 includes a box-shaped base 12 that extends along a longitudinal direction of the vehicle body, an inner cover 14 and an outer cover 15. The base 12 is provided with a pair of (front and rear) locking mechanisms 20 (which will be hereinafter described).

On the other hand, as best shown in FIG. 1, a longitudinal bar 43 is provided on the seat cushion 41. As will be appreciated, the bar 43 may act as an engagement member to be locked by the locking mechanisms 20 and may preferably be positioned in an outer side of the seat cushion 41 that faces the quarter trim panel T. Typically, as shown in FIG. 3, the both ends of the bar 43 are connected to a cushion frame 41a of the seat cushion 41. Further, the connected ends of the bar 43 are respectively covered with cover caps 41b.

Figure 4:
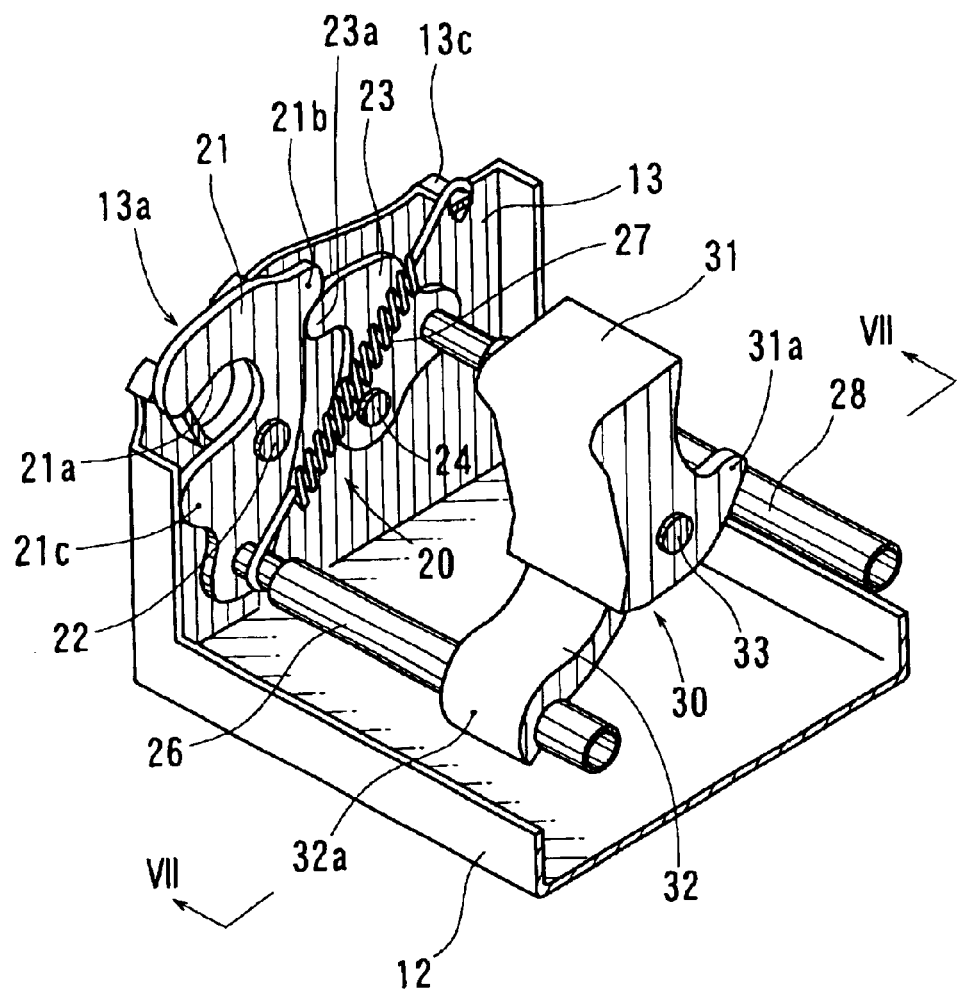
FIG. 4 is a perspective view of a locking mechanism in which an inner cover is omitted, which view illustrates its locking condition.

As shown in FIG. 4, the locking mechanisms 20 (one of which is shown) are respectively positioned in front and rear end portions of the base 12. Each of the locking mechanisms 20 may include a hook 21 that is pivotally attached to an end wall 13 (a front end wall or a rear end wall) of the base 12 via a pivot pin 22. In addition, each of the locking mechanisms 20 may includes a pawl 23 that is positioned adjacent to the hook 21 and is pivotally attached to the end wall 13 of the base 12 via a pivot pin 24. The hooks 21 of the front and rear locking mechanisms 20 are interconnected via a hook connecting rod 26 (i.e., an interconnecting member), so as to be simultaneously or synchronously moved or rotated each other. Also, the pawls 23 of the front and rear locking mechanisms 20 are interconnected via a pawl connecting rod 28 (i.e., the interconnecting member), so as to be simultaneously or synchronously moved or rotated each other. Therefore, the front and rear locking mechanisms 20 can be simultaneously or synchronously operated each other by means of the hook connecting rod 26 and the pawl connecting rod 28.

Figure 5:
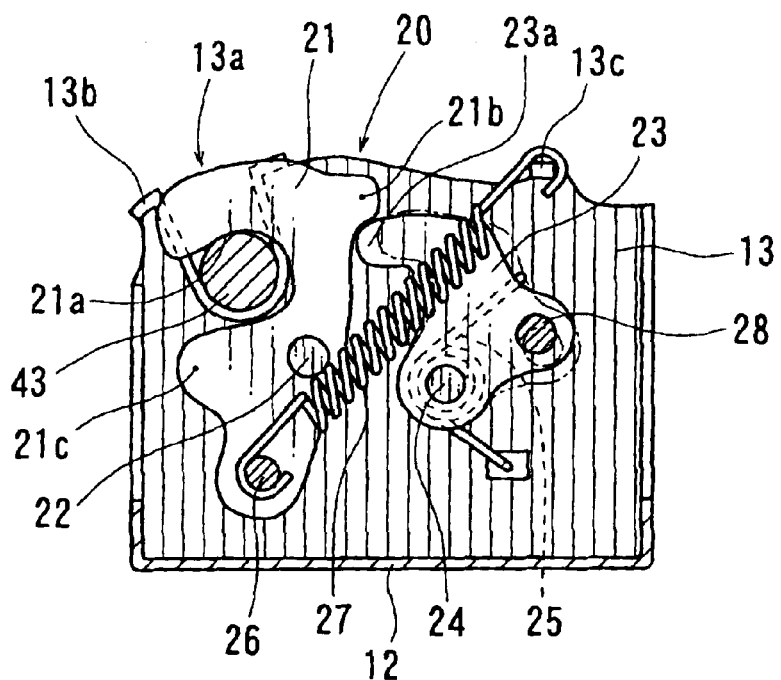
FIG. 5 is a cross-sectional view taken along line V—V in FIG. 2, which view illustrates the locking condition of the locking mechanism.
Figure 6:
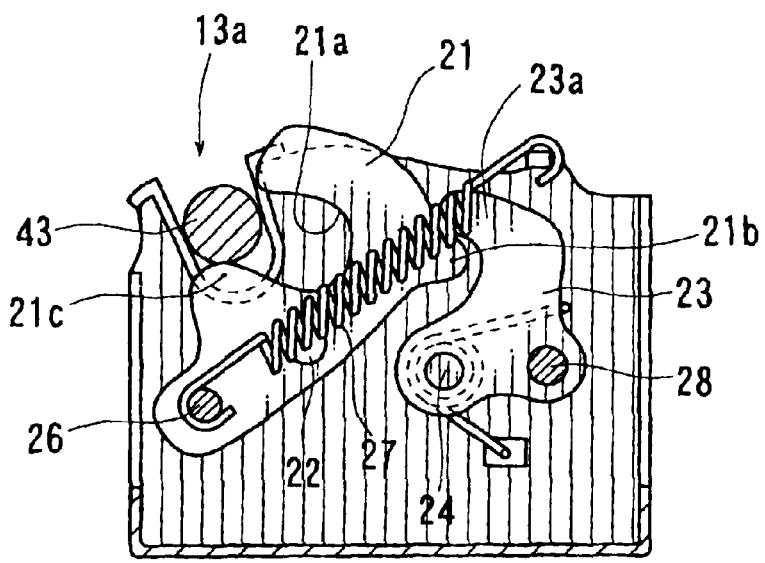
FIG. 6 is a cross-sectional view taken along line V—V in FIG. 2, which view illustrates an unlocking condition of the locking mechanism.

As shown in FIGS. 3, 5 and 6, receiving recesses 13a are formed in the end walls 13 of the base 12. Each of the receiving recesses 13a may preferably be formed as a U-shaped open recess, so that the bar 43 (the engagement member) can be received therein. Further, the U-shaped receiving recess 13a may preferably be provided with a resin bearing member 13b that may function as a cushioning member or a noise suppressor.

As best shown in FIGS. 5 and 6, the hook 21 of each of the locking mechanisms 20 may preferably has a U-shaped slot 21a. As shown in FIG. 5, when the locking mechanism 20 is in a locking condition (when the hook 21 is in a locking position), the slot 21a can engage the bar 43 that is received in the receiving recess 13a. Further, the hook 21 may preferably formed with a first or backward projected portion 21b and a second or forward projected portion 21c. The first projected portion 21b is positioned opposite to the slot 21a and projects toward the pawl 23. On the other hand, the second projected portion 21c is positioned adjacent to the slot 21a. As shown in FIG. 6, the second projected portion 21c may preferably be formed, so as to partly overlap the receiving recess 13a when the locking mechanism 20 is in an unlocking condition (when the hook 21 is in an unlocking position).

As best shown in FIG. 4, the hook connecting rod 26 that interconnects the hooks 21 may preferably be connected to a lower end of each of the hooks 21. Each of the connected portions of the hook connecting rod 26 is provided with an extension spring 27, which spring engages an engagement strip 13c formed in the end wall 13 of the base 12. As will be appreciated, the hook 21 may preferably be biased counterclockwise around the pivot pin 22 by means of the spring 27 when the hook 21 is in the locking position (FIG. 5). To the contrary, the hook 21 may preferably be biased clockwise around the pivot pin 22 by means of the spring 27 when the hook 21 is in the unlocking position (FIG. 6). In addition, the end wall 13 of the base 12 is provided with first and second detents (not shown) in order to prevent excessive rotation (counterclockwise and clockwise) of the hook 21. Further, the first detent may preferably be positioned such that the hook 21 may rotate counterclockwise beyond its locking position (FIG. 5) if the bar 43 is not received in the receiving recess 13a of the end wall 13 (FIG. 4). Therefore, when the locking mechanism 20 is locked after the bar 43 is received in the receiving recess 13a, the bar 43 can be pressed into the receiving recess 13a by means of the slot 21a of the hook 21 that is biased counterclockwise. As a result, the bar 43 can be securely clamped within the receiving recess 13a by the hook 21.

Further, although in this embodiment, the extension spring 27 is provided on each of the locking mechanisms 20, it can be provided on one of the locking mechanisms 20, if desired.

The pawl 23 may preferably be positioned such that its operation end 23a may contact a backward edge of the hook 21. The pivot pin 24 of the pawl 23 is provided with a torsion spring 25, so that the pawl 23 may preferably be biased counterclockwise around the pivot pin 24. As shown in FIG. 5, when the locking mechanism 20 is in the locking condition (when the hook 21 is in the locking position), the operation end 23a of the pawl 23 may preferably engage a lower side of the first projected portion 21b of the hook 21. On the other hand, as shown in FIG. 6, when the locking mechanism 20 is in the unlocking condition (when the hook 21 is in the unlocking position), the operation end 23a of the pawl 23 may preferably engage an upper side of the first projected portion 21b. Therefore, the pawl 23 may function as a retainer that maintains the locking position or the unlocking position of the hook 21.

As best shown in FIG. 4, a lever 30 (i.e., an operation member for unlocking the locking mechanism 20) is bridged between the hook connecting rod 26 and the pawl connecting rod 28. The lever 30 may preferably be positioned at substantially an intermediate point of the hook connecting rod 26 and the pawl connecting rod 28. The lever 30 may preferably comprise a first portion or manipulation portion 31 and a second portion or operation portion 32 that are rotatably or pivotally interconnected via a pivot pin 33.

Figure 7:
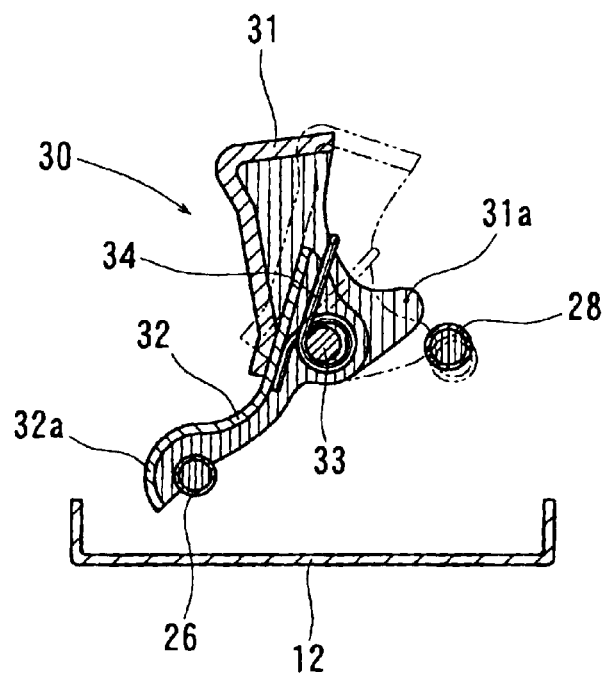
FIG. 7 is a cross-sectional view taken along line VII—VII in FIG. 4, which view illustrates a position of a lever when the locking mechanism is in the locking condition.
Figure 8:
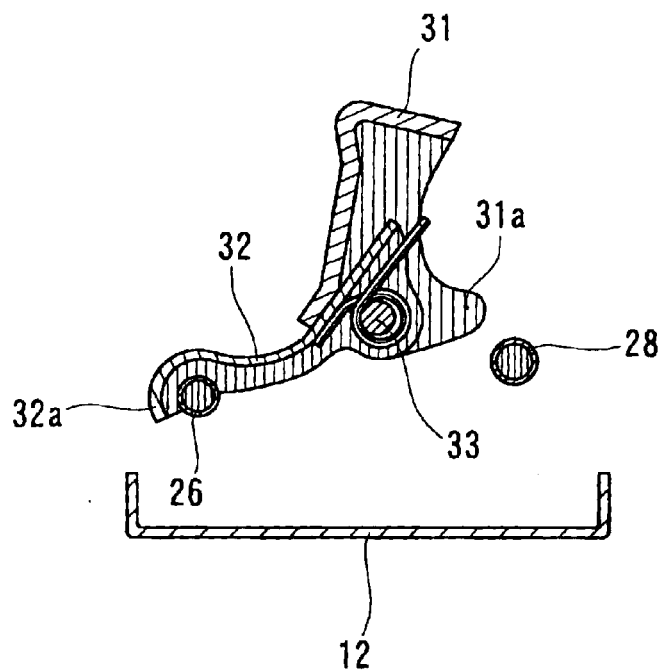
FIG. 8 is a cross-sectional view similar to FIG. 7, which view illustrates a position of the lever when the locking mechanism is in the unlocking condition.

As shown in FIGS. 7 and 8, the operation portion 32 has a proximal end 32a, which portion is fixedly connected to the hook connecting rod 26 by welding or other such connecting means. The manipulation portion 31 has a projected cam portion 31a, which portion is adapted to contact the pawl connecting rod 28. In addition, the pivot pin 33 of the lever 30 is provided with a torsion spring 34, so that the manipulation portion 31 may preferably be biased counterclockwise relative to the operation portion 32.

Operation for dismounting the vehicle seat 40 that is mounted on the vehicle body will now be described in detail. As will be recognized, when the vehicle seat 40 is mounted on the vehicle body, the engagement member or bar 43 is received in the receiving recess 13a of the end wall 13 of the base 12 and the locking mechanism 20 positioned on the base 12 is in the locking condition (FIG. 5). Further, the base 12 is covered with the inner cover 14 and the outer cover 15.

First, the seat back 42 is rotated to the folded or horizontal position, and then the outer cover 15 is removed, so that the manipulation portion 31 of the lever 30 is exposed (FIG. 2). Thereafter, the lever is operated. That is, the exposed manipulation portion 31 is pressed. As a result, the manipulation portion 31 is rotated clockwise around the pivot pin 33 against the spring force of the torsion spring 34, so that the cam portion 31a of the manipulation portion 31 contacts or engages the pawl connecting rod 28. As will be recognized, at this time, only the manipulation portion 31 is rotated relative to the operation portion 32 and the operation portion 32 is not substantially moved. As shown in FIG. 7, when the manipulation portion 31 is further pressed, the pawl connecting rod 28 is pressed down to a position shown by a broken line. As a result, as shown in FIG. 5, the pawl 23 that is connected to the pawl connecting rod 28 is pivoted clockwise around the pivot pin 24 against the spring force of the torsion spring 25 and is shifted to a position shown by a broken line. Thus, the operation end 23a of the pawl 23 is disengaged from the lower side of the first projected portion 21b of the hook 21, thereby permitting clockwise rotation of the hook 21.

Thereafter, when the manipulation portion 31 is further pressed and rotated over the position shown by the broken line in FIG. 7, the cam portion 31a of the manipulation portion 31 is disengaged from the pawl connecting rod 28 and the operation portion 32 is moved together with the manipulation portion 31. Therefore, the hook connecting rod 26 that is connected to the operation portion 32 is forced upwardly and as a result, the hook 21 is rotated clockwise around the pivot pin 22 against the spring force of the extension spring 27 and is shifted to a position shown in FIG. 6 (i.e., the unlocking position), so that the slot 21a of the hook 21 is disengaged from the bar 43. At this time, the bar 43 that is received within the receiving recess 13a is pushed up by the second projected portion 21c of the hook 21. Thus, the locking mechanism 20 is unlocked, so that the bar 43 can be removed from the receiving recess 13a. As a result, the vehicle seat 40 can be dismounted from the vehicle body.

As will be recognized, the biasing direction of the hook 21 is changed or turned over in the course of rotation from its locking position shown in FIG. 5 to its unlocking position shown in FIG. 6, because the spring 27 moves across the pivot pin 22 when the hook 21 rotates from its locking position to its unlocking position. Thus, when the hook 21 is shifted to its unlocking position, the hook 21 is biased clockwise by means of the spring 27. As a result, the hook 21 can be retained in its unlocking position. Further, when the cam portion 31a of the manipulation portion 31 is disengaged from the pawl connecting rod 28, the pawl 23 may preferably be pivoted counterclockwise around the pivot pin 24 by means of the spring force of the torsion spring 25. Therefore, when the hook 21 is shifted to its unlocking position, the operation end 23a of the pawl 23 elastically engages the upper side of the first projected portion 21b of the hook 21 (FIG. 6).

According to the seat mounting device of this embodiment, the bar 43 can be removed from the receiving recess 13a by simply lifting up the vehicle seat 40 after the locking mechanism 20 is unlocked. In other words, the bar 43 can be removed from the receiving recess 13a by simply moving the vehicle seat 40 in one direction (upwardly). Therefore, the vehicle seat 40 can be easily dismounted from the vehicle body.

According to the seat mounting device of this embodiment, as previously described, the locking mechanism 20 can be easily unlocked by simply pressing the manipulation portion 31 of the lever 30. That is, the locking mechanism 20 can be unlocked in one operation. Once the locking mechanism 20 is unlocked, the vehicle seat 40 can be dismounted from the vehicle body by removing the bar 43 from the receiving recess 13a. Further, the bar 43 can be utilized as a grip for handling the vehicle seat 40. In addition, the hook 21 of the locking mechanism 20 can be reliably maintained in the unlocking position by means of the extension spring 27 and the pawl 23. Therefore, the hook 21 can be effectively prevented from rotating toward the locking position thereof even if the vehicle body is unexpectedly subjected to shock and vibration.

Next, operation for mounting the vehicle seat 40 onto the vehicle body will now be described in detail. First, the hook 21 of the locking mechanism 20 is positioned on the unlocking position by operating the manipulation portion 31 of the lever 30 (FIG. 6). Thereafter, the bar 43 of the vehicle seat 40 is aligned with the receiving recess 13a of the end wall 13 of the base 12 and is then pushed thereinto. As a result, the second projected portion 21c of the hook 21 is pressed down by the bar 43, so that the hook 21 is rotated counterclockwise around the pivot pin 22 toward its locking position against the spring force of the spring 27, thereby disengaging the operation end 23a of the pawl 23 from the upper side of the first projected portion 21b of the hook 21. At this time, the biasing direction of the hook 21 is turned over such that the hook 21 may preferably be biased counterclockwise by the spring 27. As a result, the hook 21 is rotated or pivoted counterclockwise by the spring 27 and is shifted to the locking position (FIG. 5), so that the slot 21a of the hook 21 may preferably engage the bar 43, thereby clamping the bar 43 within the receiving recess 13a. Further, when the hook 21 is shifted to the locking position, the operation end 23a of the pawl 23 elastically engages the lower side of the first projected portion 21b of the hook 21. Thus, the locking mechanism 20 is locked, so that the vehicle seat 40 is mounted on the vehicle body.

According to the seat mounting device of this embodiment, the bar 43 can be engaged with the receiving recess 13a by simply pushing down the vehicle seat 40. In other words, the bar 43 can be engaged with the receiving recess 13a by simply moving the vehicle seat 40 in one direction (downwardly). Therefore, the vehicle seat 40 can be easily mounted on the vehicle body. In addition, the locking mechanism 20 can be automatically locked when the bar 43 is engaged with the receiving recess 13a As described above, according to the seat mounting device of this embodiment, when the locking mechanism 20 is in the locking condition, the bar 43 is pressed into the receiving recess 13a by the slot 21a of the hook 21 that is biased by the extension spring 27. Therefore, the bar 43 can be securely clamped within the receiving recess 13a. In addition, the hook 21 can be reliably maintained in its locking position by means of the extension spring 27 and the pawl 23. As a result, the bar 43 can be effectively prevented from disengaging from the receiving recess 13a even if the vehicle seat 40 is applied with a large force. Moreover, because the receiving recess 13a is provided with the resin bearing member 13b, the bar 43 can be closely received in the receiving recess 13a. As a result, the bar 43 may preferably be prevented from longitudinally and laterally moving within the receiving recess 13a, thereby reducing noises and sounds.

In the seat mounting device of this embodiment, a pair of (front and rear) locking mechanisms 20 are used, so that the bar 43 can be clamped at two separate points on the longitudinal axis thereof. These locking mechanisms 20 can be simultaneously unlocked by simply pressing the manipulation portion 31 of the lever 30 (i.e., in one operation). In addition, the bar 43 can be engaged with or disengaged from the receiving recess 13a by simply pushing down or lifting up the vehicle seat 40 (i.e., by moving the vehicle seat 40 in one direction). Moreover, the seat 40 is provided with no additional member except for the bar 43 and as a result, the seat 40 is remarkably lightened. In addition, because the bar 43 can be utilized as a grip, the vehicle seat 40 can be easily handled.

Further, the locking mechanisms 20 and the bar 43 may preferably act as a hinge when the bar 43 is locked by the locking mechanisms 20. Therefore, the vehicle seat 40 can be effectively stabilized when it is put against the side wall of the vehicle body, because the bar 43 can be supported by two points.

Further, the outer cover 15 of the case 10 can completely cover the locking mechanisms 20 that are received in the case 10. Therefore, the present seat mounting device does not affect an appearance of a vehicle cabin. Also, the cover 15 may effectively prevent the lever 30 from being inadvertently operated by a user.

Second Detailed Representative Embodiment

Figure 9:
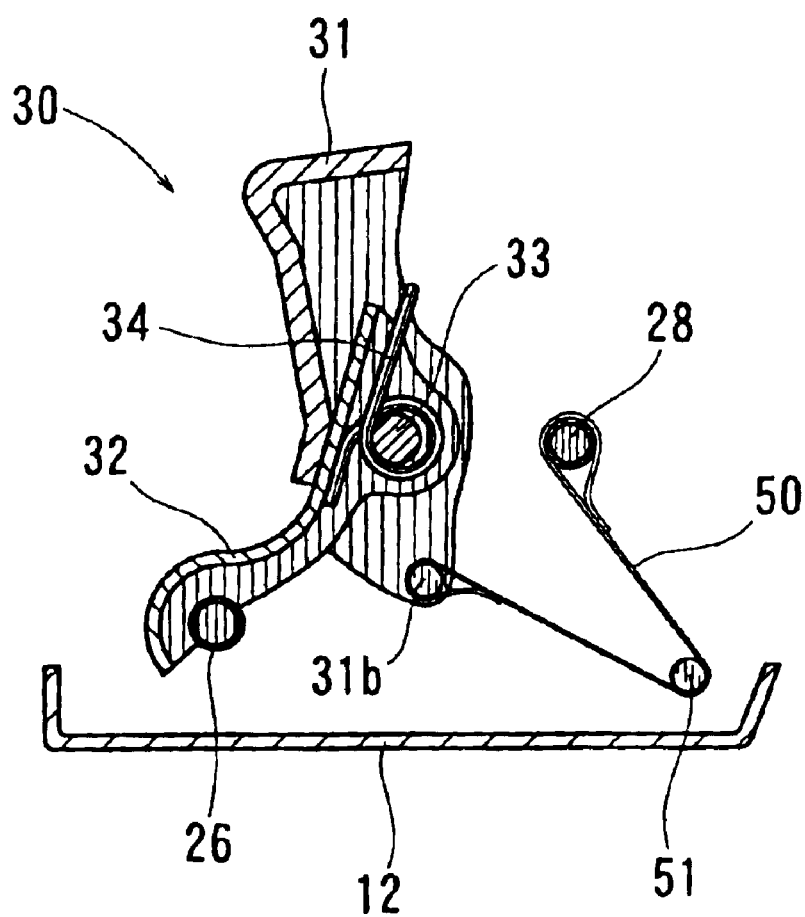
FIG. 9 is a cross-sectional view similar to FIG. 7, which view illustrates a seat mounting device according to a second embodiment of the present teachings.

The second detailed representative embodiment will now described with reference to FIG. 9. Because the second embodiment relates to the first embodiment, only constructions and elements that are different from the first embodiment will be explained in detail. Elements that are the same in the first and second embodiments will be identified by the same reference numerals and detailed description of such elements will be omitted.

In this embodiment, the manipulation portion 31 does not have a portion that corresponds to the projected cam portion 31a of the first embodiment. Instead, the manipulation portion 31 may include a belt 50 that is engaged with a guide rod 51 that is secured to the base 12. One end of the belt 50 is connected to a pin 31b that is secured to the manipulation portion 31 and the other end of the belt 50 is connected to the pawl connecting rod 28.

According to this embodiment thus constructed, when the manipulation portion 31 is pressed and rotated clockwise around the pivot pin 33, the belt 50 is pulled around the guide rod 51, so that the pawl connecting rod 28 is pulled down. As a result, similar to the first embodiment, the pawl 23 that is connected to the pawl connecting rod 28 is pivoted clockwise around the pivot pin 24 against the spring force of the torsion spring 25. Thus, the operation end 23a of the pawl 23 is disengaged from the lower side of the first projected portion 21b of the hook 21, thereby permitting clockwise rotation of the hook 21.

Various changes and modifications may be made to the representative embodiments without departing from the scope of the present invention. For example, although two locking mechanisms 20 are used in the first and second embodiments, three or more locking mechanisms can be used, if desired. Of course, the locking mechanisms 20 and the bar 43 can be respectively provided on the vehicle seat 40 and vehicle body, if desired.

Representative examples of the present teachings have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A seat mounting device for a vehicle seat, comprising:
    at least one locking mechanism provided on one of a vehicle seat and a vehicle body,
    an engagement member provided on the other of the vehicle seat and the vehicle body and arranged and constructed to be locked by the locking mechanism, and
    an operation member for unlocking the locking mechanism, the operation member comprising a manipulation portion and an operation portion,
    wherein the locking mechanism has a hook that engages the engagement member and a pawl that engages the hook and maintains it in a locking position, wherein when the operation member is operated, the manipulation portion is moved relative to the operation portion so as to engage and move the pawl, thereby disengaging the pawl from the hook, and wherein when the operation member is further operated, the manipulation portion is disengaged from the pawl, and then the operation portion is moved together with the manipulation portion so as to act and move the hook, thereby moving the hook to an unlocking position.

2. A seat mounting device as defined in claim 1, wherein the at least one locking mechanism comprises two or more locking mechanisms.

3. A seat mounting device as defined in claim 2, wherein the locking mechanisms are interconnected via an interconnecting member, so as to be synchronously operated each other.

4. A seat mounting device as defined in claim 1, wherein the at least one locking mechanism and the engagement member are respectively provided on the vehicle body and the vehicle seat.

5. A seat mounting device as defined in claim 4, wherein the engagement member is arranged and constructed to function as a grip for handling the seat.

6. A seat mounting device as defined in claim 1, wherein the at least one locking mechanism comprises a first rod connected to the hook, a second rod connected to the pawl and a spring attached to the first rod, the first and second rods being linked to the operation member, and wherein the spring is arranged and constructed to force the hook to the locking position when the operation member is not operated and to force the hook to the unlocking position when the operation member is operated.

* * * * *